(12) United States Patent
Frolov

(10) Patent No.: US 10,449,648 B2
(45) Date of Patent: Oct. 22, 2019

(54) TRANSFERRING ROTATION TORQUE THROUGH ISOLATOR FOR TABLE SAW

(71) Applicants: Robert Bosch Tool Corporation, Broadview, IL (US); Robert Bosch GmbH, Stuttgart (DE)

(72) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 479 days.

(21) Appl. No.: 15/228,432

(22) Filed: Aug. 4, 2016

(65) Prior Publication Data

US 2018/0036853 A1 Feb. 8, 2018

(51) Int. Cl.
| | |
|---|---|
| *B23Q 11/00* | (2006.01) |
| *B23Q 17/24* | (2006.01) |
| *B23D 59/00* | (2006.01) |
| *B23D 47/12* | (2006.01) |

(52) U.S. Cl.
CPC .......... *B23Q 11/0082* (2013.01); *B23D 47/12* (2013.01); *B23D 59/002* (2013.01); *B23Q 11/0092* (2013.01); *B23Q 17/2438* (2013.01)

(58) Field of Classification Search
CPC . B23Q 11/0082; B23Q 11/0092; B23Q 11/06; B23Q 17/2438; B23D 47/12; B23D 47/123; B23D 59/002; F16P 3/12; F16P 3/14–3/148; F16P 3/008; F16D 2001/102; F16D 2001/103; F16D 3/68; F16D 3/76; F16D 1/108; F16D 1/116; F16H 55/14; F16H 55/16; F16H 2055/306; F16B 21/073; F16B 21/078; F16B 21/16; F16B 21/18; F16B 21/183; F16B 21/186

USPC ........ 83/666; 408/710; 173/217; 464/73–75, 464/150–152, 180, 88; 403/359.5
See application file for complete search history.

(56) References Cited

U.S. PATENT DOCUMENTS 1,937,965 A * 12/1933 Johnson .................. F16B 21/02
384/420
2,072,201 A 3/1937 Dibble
(Continued)

FOREIGN PATENT DOCUMENTS

| WO | WO-2006002463 A1 * | 1/2006 | ............. B63H 23/34 |
|---|---|---|---|
| WO | 2014151073 A1 | 9/2014 | |
| WO | 2016145223 A1 | 9/2016 | |

OTHER PUBLICATIONS

International Search Report corresponding to International Patent Application No. PCT/EP2017/069771 (4 pages).

*Primary Examiner* — Stephen F. Gerrity
*Assistant Examiner* — Joshua G Kotis
(74) *Attorney, Agent, or Firm* — Maginot Moore & Beck LLP

(57) ABSTRACT

An output member is configured to transfer rotation and torque from a motor of a power tool to a working element of the power tool. The working element is configured to contact a workpiece. The output member includes a hub, an outer shell, and an isolator. The hub is configured to be driven rotationally about an axis of rotation by the motor of the power tool. The outer shell is configured to be coupled to the working element of the power tool. The isolator is interposed between the hub and the outer shell and is configured to electrically isolate the hub from the outer shell.

8 Claims, 9 Drawing Sheets

(56) References Cited

U.S. PATENT DOCUMENTS

| | | | | |
|---|---|---|---|---|
| 2,625,415 | A | * | 1/1953 | Smith .................. F16D 1/0858 29/451 |
| 3,257,860 | A | * | 6/1966 | Runde ................ B62D 55/0963 464/75 |
| 3,424,287 | A | * | 1/1969 | Dreiding .............. F16D 1/0835 192/55.2 |
| 3,685,843 | A | * | 8/1972 | Jacyno ................ B23B 31/1207 408/239 R |
| 3,797,960 | A | * | 3/1974 | McCarthy ........... B23B 31/1207 174/138 D |
| 3,808,479 | A | | 4/1974 | Mezey |
| 3,832,076 | A | * | 8/1974 | Gehrke .................. F16B 21/18 403/359.5 |
| 3,911,384 | A | | 10/1975 | Andersson et al. |
| 4,119,554 | A | | 10/1978 | Fujiwara |
| 4,136,982 | A | * | 1/1979 | Sagady .................. F16B 21/18 403/108 |
| 4,357,137 | A | * | 11/1982 | Brown ...................... F16D 1/06 464/150 |
| 4,657,428 | A | * | 4/1987 | Wiley ................... B24B 45/006 403/359.3 |
| 4,685,823 | A | * | 8/1987 | Lopez ...................... F16D 1/06 29/558 |
| 4,854,890 | A | | 8/1989 | Nishimura |
| 6,407,454 | B1 | | 6/2002 | Chang et al. |
| 7,303,337 | B2 | | 12/2007 | Fujimoto et al. |
| 8,434,041 | B2 | | 4/2013 | Chen et al. |
| 8,435,645 | B2 | | 5/2013 | Shibue et al. |
| 8,462,593 | B1 | | 6/2013 | Komura et al. |
| 8,860,143 | B2 | | 10/2014 | Zhao et al. |
| 8,943,937 | B2 | | 2/2015 | Haldar et al. |
| 9,387,598 | B2 | | 7/2016 | Voong et al. |
| 2002/0017179 | A1 | * | 2/2002 | Gass ...................... B23D 47/08 83/58 |
| 2002/0017336 | A1 | * | 2/2002 | Gass ..................... B23D 59/001 144/2.1 |
| 2002/0190581 | A1 | | 12/2002 | Gass et al. |
| 2004/0045520 | A1 | * | 3/2004 | Slopsema ............... F02B 75/06 123/192.2 |
| 2004/0123709 | A1 | * | 7/2004 | Metzger, Jr. ......... B23D 59/001 83/76.1 |
| 2005/0192103 | A1 | * | 9/2005 | Hauck ...................... F16D 3/68 464/75 |
| 2007/0264077 | A1 | * | 11/2007 | Kitahata .................. F16D 3/06 403/359.1 |
| 2011/0048197 | A1 | | 3/2011 | Winkler |
| 2012/0004043 | A1 | * | 1/2012 | Lehmann ................. F16D 3/68 464/93 |
| 2014/0339195 | A1 | | 11/2014 | Gentsch |
| 2015/0162663 | A1 | | 6/2015 | Boryssenko et al. |
| 2015/0314409 | A1 | * | 11/2015 | Chiu ....................... B23D 47/12 307/326 |
| 2015/0323014 | A1 | * | 11/2015 | Clark ....................... F16D 1/06 403/14 |

\* cited by examiner

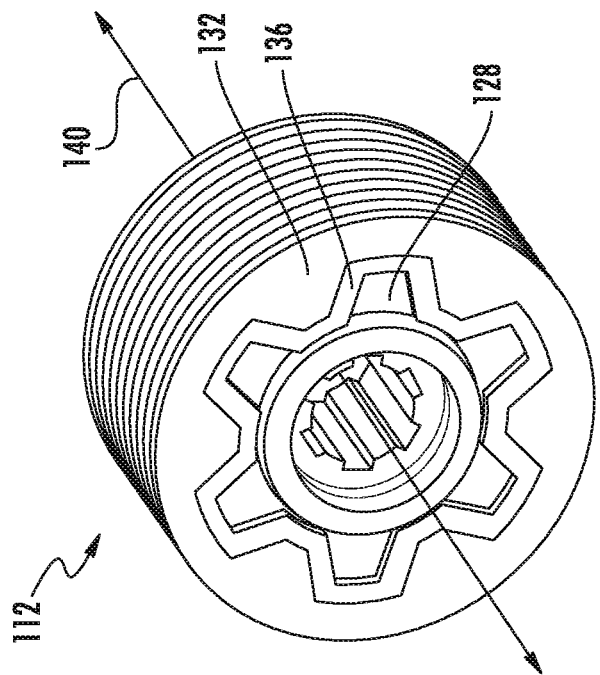
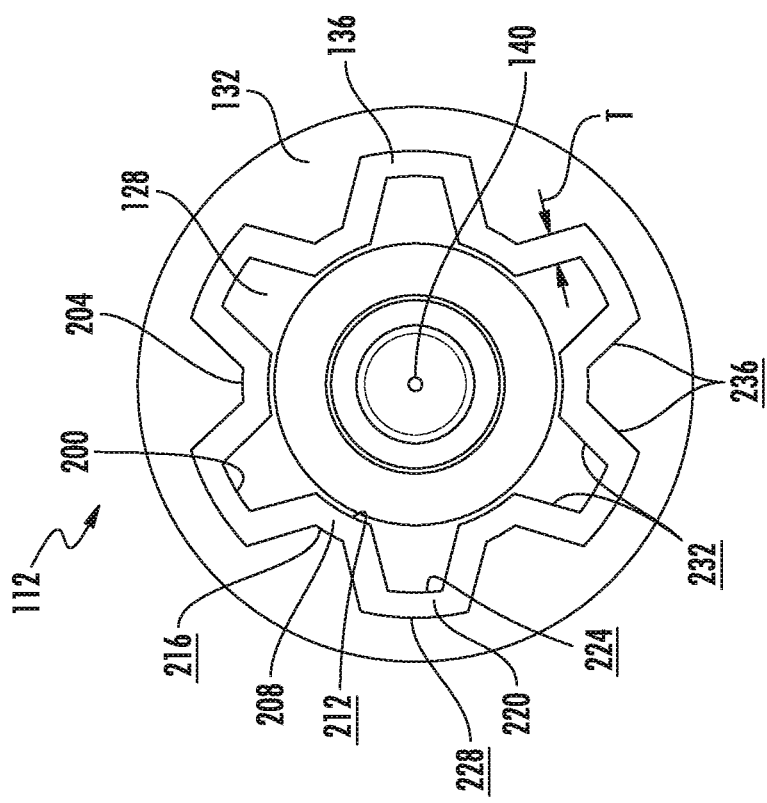

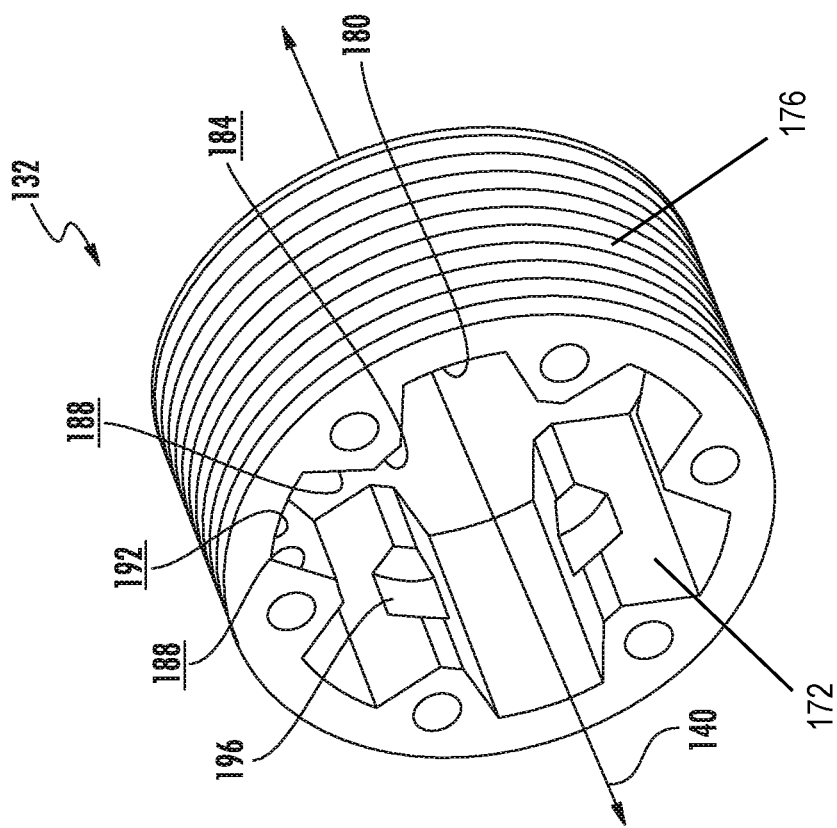
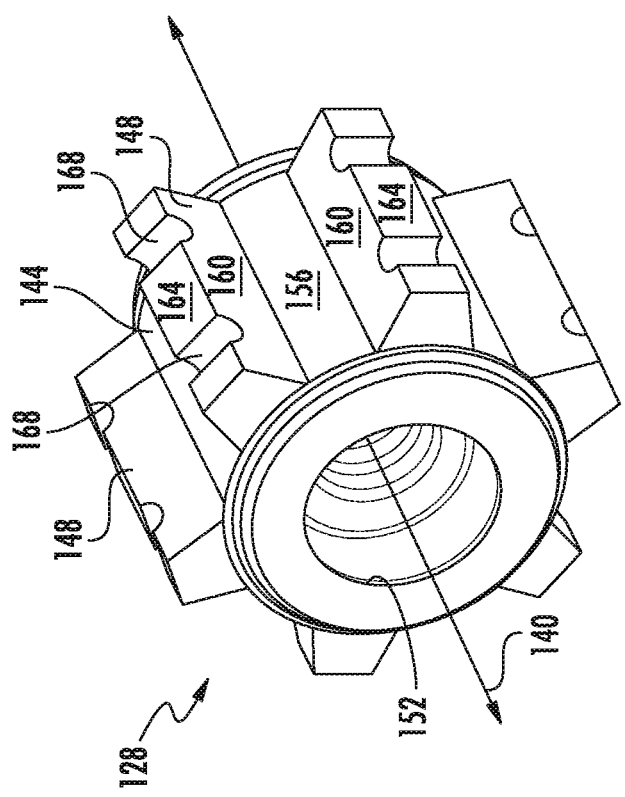

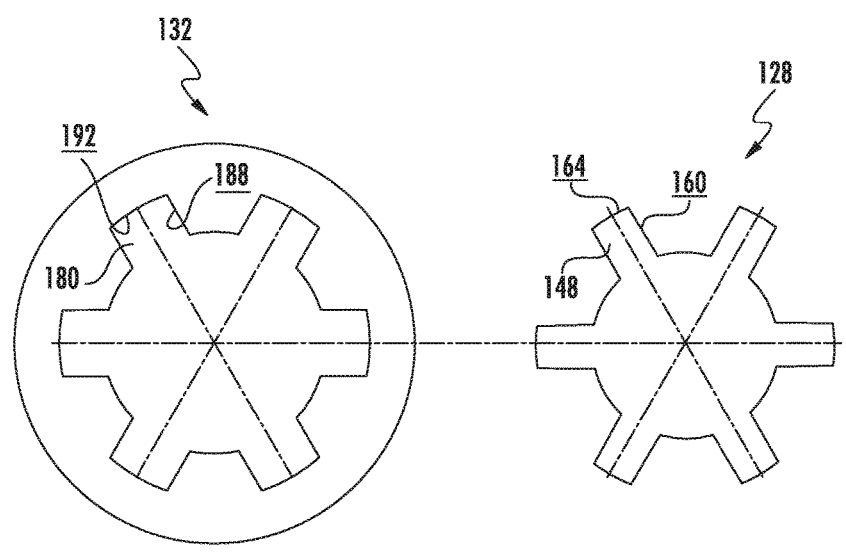

TRANSFERRING ROTATION TORQUE THROUGH ISOLATOR FOR TABLE SAW

FIELD

This application relates to the field of parts for transferring torque and rotation and, particularly to parts for transferring torque and rotation that include a dielectric isolator.

BACKGROUND

A number of power tools have been produced to facilitate forming a work piece into a desired shape. One such power tool is a miter table saw. Miter table saws present a safety concern because the saw blade of the miter table saw is typically very sharp and moving at a high rate of speed. Accordingly, severe injury such as severed digits and deep lacerations can occur almost instantaneously. A number of different safety systems have been developed for miter table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, a user's finger is nonetheless in proximity to the moving blade, particularly when attempting to secure a work piece as the miter table saw is used to shape the work piece.

Accordingly, detection or sensing systems have been developed for use with various kinds of manufacturing equipment and power tools. Such detection systems are operable to trigger a reaction device by detecting or sensing the proximity or contact of some appendage of an operator with some part of the equipment. For example, existing capacitive contact sensing systems in table saws detect contact between the operator and the blade.

In particular, miter table saw safety systems have been developed which are intended to stop the blade when a user's hand approaches or touches the blade. Various stopping devices have been developed including braking devices which are physically inserted into the teeth of the blade. In general, upon detection of a person in the vicinity of the blade, a signal is processed and sent to a brake mechanism to stop blade rotation within a short period of time. One such system is disclosed in U.S. Pat. No. 8,943,937, the disclosure of which is incorporated herein by reference in its entirety. Another such system is disclosed in U.S. Pat. No. 9,387,598, the disclosure of which is incorporated herein by reference in its entirety. In other systems, a mechanical or electrical brake is used.

In many of these safety systems, electrical energy is provided to a drive member, which drives the rotational movement of the blade, and electrical energy is also provided to the blade, to generate a signal indicative of contact between the person and the blade. Thus, it is necessary to isolate the electrical energy provided to the drive member and the electrical energy provided to the blade. However, it is difficult to combine mechanical strength, to transfer rotation and torque from the drive member to the blade, with dielectric properties, to electrically isolate the electrical energy provided to the drive member from the electrical energy provided to the blade.

What is needed therefore is a connection between a drive member and a working element, such as a blade, which is able to transfer rotation and torque from the drive member to the working element and is also able to electrically isolate electrical energy provided to the drive member from electrical energy provided to the working element.

SUMMARY

In one preferred embodiment of the present disclosure, an output member is configured to transfer rotation and torque from a motor of a power tool to a working element of the power tool. The working element of the power tool is configured to contact a workpiece. The output member includes a hub, an outer shell, and an isolator. The hub is configured to be driven rotationally about an axis of rotation by the motor of the power tool. The outer shell is configured to be coupled to the working element of the power tool. The isolator is interposed between the hub and the outer shell and is configured to electrically isolate the hub from the outer shell.

In another preferred embodiment of the present disclosure, a power tool is configured to perform a process on a workpiece. The power tool includes a motor, a working element, and an output member. The motor is configured to generate rotation and torque. The working element is configured to contact the workpiece. The output member is configured to transfer the rotation and torque from the motor to the working element. The output member includes an axis of rotation, a hub, an outer shell, and an isolator. The axis of rotation is an axis about which the output member is configured to be driven rotationally by the motor. The hub is configured to be coupled to the motor. The outer shell is configured to be coupled to the working element. The isolator is interposed between the hub and the outer shell and is configured to electrically isolate the hub from the outer shell.

BRIEF DESCRIPTION OF THE DRAWINGS

FIG. 2A depicts a front elevation view of an output member including a hub, a isolator, and an outer shell configured for use in the power tool shown in FIG. 1.

FIG. 2B depicts a front perspective view of the output member of FIG. 2A.

FIG. 3A depicts a front perspective view of one embodiment of a hub configured for use in the output member shown in FIGS. 2A and 2B.

FIG. 3B depicts a front perspective view of one embodiment of an outer shell configured for use in the output member shown in FIGS. 2A and 2B.

FIG. 11A depicts another alternative shape of the outer member of FIG. 9A.

FIG. 11B depicts another alternative shape of the hub of FIG. 9C that is complementary to the alternative shape of the outer member of FIG. 11A.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

As used herein, the term "power tool" refers to any tool with one or more moving parts that are moved by an actuator, such as an electric motor, an internal combustion engine, a hydraulic or pneumatic cylinder, and the like. For example, power tools include, but are not limited to, bevel saws, miter table saws, table saws, circular saws, reciprocating saws, jig saws, band saws, cold saws, cutters, impact drives, angler grinders, drills, jointers, nail drivers, sanders, trimmers, and routers. As used herein, the term "working element" refers to a moving part of the power tool that is at least partially exposed during operation of the power tool. Examples of implements in power tools include, but are not limited to, rotating and reciprocating saw blades, drill bits, routing bits, grinding disks, grinding wheels, and the like. As described below, an output member for use with a power tool is used to transfer rotation and torque generated by the power tool to the working element and is further configured to electrically isolate the electrical energy provided to a drive member of the power tool from the electrical energy provided to the working element.

Figure 1:
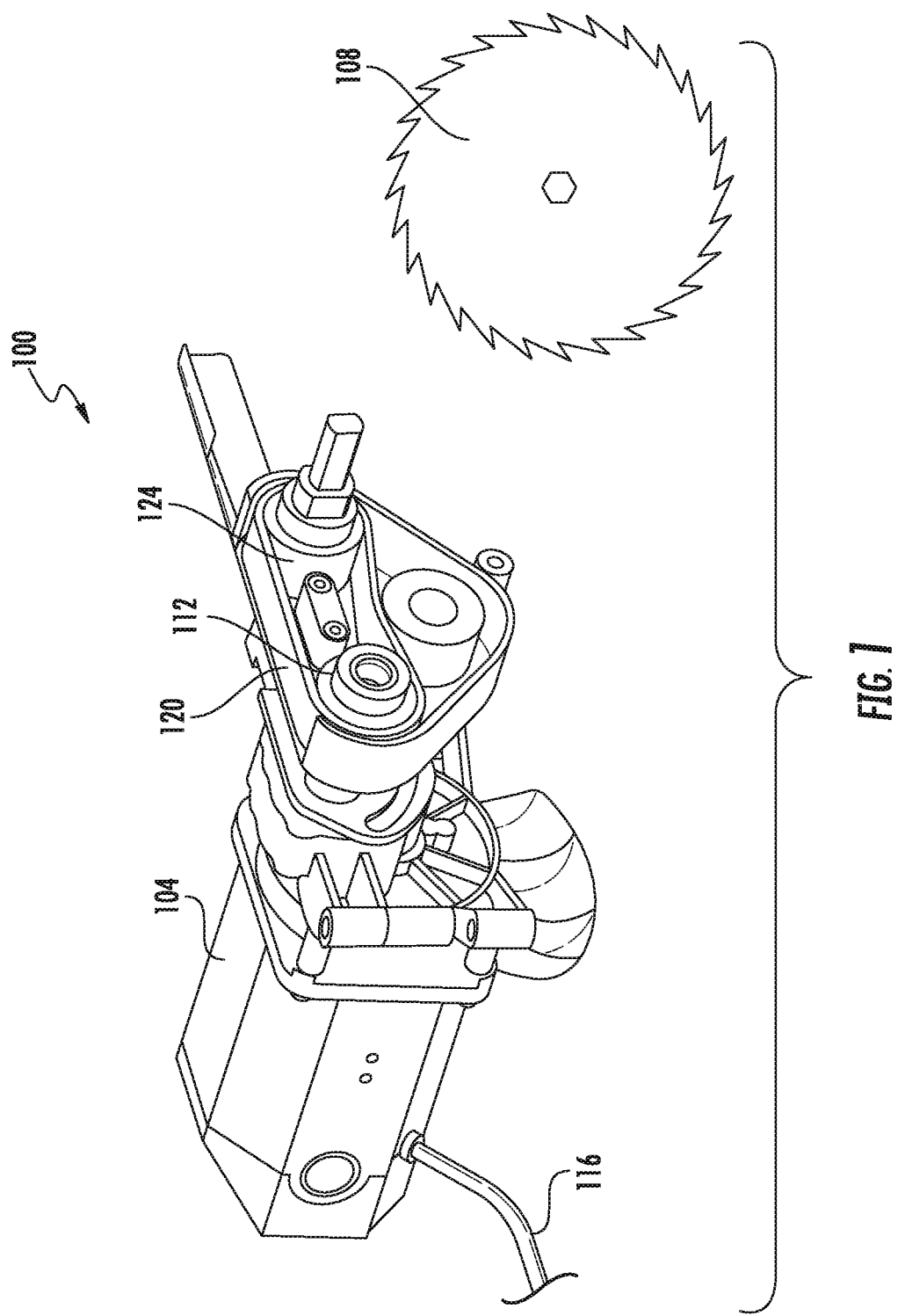
FIG. 1 depicts a partial exploded view of a power tool including an output member configured to transfer rotation and torque from a motor of the power tool to a working element of the power tool.

FIG. 1 depicts a power tool 100, according to the present disclosure, which includes a motor 104, a saw blade 108, and an output member 112. In the embodiment shown, the power tool 100 is a table saw, however, in alternative embodiments, the power tool 100 can be another tool configured to perform a process on a workpiece. The motor 104 is provided with electrical energy via an external energy source 116 to generate rotation and torque. Accordingly, the motor 104 is "a drive member." In the embodiment shown in FIG. 1, the rotation and torque generated by the motor 104 are imparted to the output member 112, which is configured as a pulley. Thus, rotation of the output member 112 drives a belt 120, which rotates another pulley 124 that is coupled to the saw blade 108. Thus, in the embodiment shown in FIG. 1, the saw blade 108 is physically coupled to the motor 104 via the output member 112, the belt 120, and the pulley 124, and the output member 112 is electrically coupled to the motor 104.

The power tool 100 further includes an automatic braking system configured to stop the transfer of rotation and torque from the motor 104 to the saw blade 108. The automatic braking system provides electrical energy to the saw blade 108 to enable detection of the proximity or contact of some appendage of an operator with the saw blade 108. As described in more detail below, the output member 112 includes an isolator configured to electrically separate the electrical energy provided to the output member 112 from the motor 104 from electrical energy provided to the output member 112 from the saw blade 108.

As shown in FIGS. 2A and 2B, the output member 112 includes a hub 128, an outer shell 132, and an isolator 136. The hub 128 is configured to receive the rotation and torque generated by the motor 104 (shown in FIG. 1) such that the hub 128 is rotated about an axis of rotation 140. The outer shell 132 is configured to be coupled to the saw blade 108 (shown in FIG. 1), in this embodiment, via the belt 120 and the pulley 124. The isolator 136 is interposed between the hub 128 and the outer shell 132 and is configured to electrically isolate the hub 128 from the outer shell 132.

As shown more clearly in FIG. 3A, the hub 128 includes a main body 144 and a plurality of spokes 148 integrally formed with the main body 144. The spokes 148 project radially outwardly from the main body 144 in a direction away from the axis of rotation 140. The main body 144 is generally shaped as a hollow cylinder centered about the axis of rotation 140 and includes a central opening 152 formed along the axis of rotation 140 and an outwardly facing main body surface 156 opposite the central opening 152. The outwardly facing main body surface 156 faces away from the axis of rotation 140. The hub 128 is made of a metal material, such as, for example steel. In alternative embodiments, however, the hub 128 can be made of another metal material having similar mechanical and electrical properties to steel.

The spokes 148 of the hub 128 include angled outwardly facing surfaces 160 and an outermost circumferential surface 164 connecting the angled outwardly facing surfaces 160. The outermost circumferential surfaces 164 of all of the spokes 148 are formed on a substantially concentric ring about the axis of rotation 140. The spokes 148 are substantially symmetrically shaped such that the angled outwardly facing surfaces 160 of each spoke 148 meet the outwardly facing main body surface 156 at angles that are mirrored opposites of one another and such that the angled outwardly facing surfaces 160 of each spoke 148 meet the outermost circumferential surface of the spoke 148 at angles that are mirrored opposites of one another.

The spokes 148 further include notches 168 formed in the outermost circumferential surface 164 and extending slightly into the angled outwardly facing surfaces 160. As explained in more detail below, the notches 168 assist in firmly coupling the isolator 136 to the hub 128 to prevent movement of the isolator 136 relative to the hub 128 in a direction along the axis of rotation 140.

As shown in FIG. 3B, the outer shell 132 is generally complementarily shaped to the hub 128. The outer shell 132 is generally shaped as a hollow cylinder centered about the axis of rotation 140 and includes a shaped opening 172 formed along the axis of rotation 140 and an outwardly facing surface 176 opposite the shaped opening 172. The outwardly facing surface 176 faces away from the axis of rotation 140. In the embodiment shown in FIG. 3B, the shaped opening 172 includes cut-outs 180 that are shaped generally complementarily to the spokes 148 of the hub 128. The outer shell 132 is made of a metal material, such as, for example, aluminum. In alternative embodiments, however, the outer shell 132 can be made of another metal material having similar mechanical and electrical properties to aluminum.

The cut-outs 180 are formed in an innermost circumferential surface 184 of the outer shell 132 and are shaped generally complementarily to the spokes 148 of the hub 128. More specifically, the cut-outs 180 include angled inwardly facing surfaces 188 and outermost circumferential surfaces 192. When the hub 128 is received within the outer shell 132, as shown in FIGS. 2A and 2B, the spokes 148 are received within corresponding cut-outs 180 such that the outwardly facing main body surface 156 is facing toward the innermost circumferential surface 184 of the outer shell 132, the angled outwardly facing surfaces 160 of the spokes 148 are facing toward the angled inwardly facing surfaces 188 of the cut outs 180, and the outermost circumferential surfaces 164 of the spokes 148 are facing toward the outermost circumferential surface 192 of the outer shell 132.

The outer shell 132 also includes notches 196 formed in the innermost circumferential surface 184 and extending slightly into the angled inwardly facing surfaces 188 of the cut-outs 180. As explained in more detail below, the notches 196 assist in firmly coupling the isolator 136 to the outer shell 132 to prevent movement of the isolator 136 relative to the outer shell 132 in a direction along the axis of rotation 140.

As shown in FIG. 2A, the isolator 136 is interposed between the hub 128 and the outer shell 132. Thus, the isolator 136 is shaped as a hollow part including internal indentations 200 configured to matingly receive the spokes 148 of the hub 128 and external indentations 204 configured to be matingly received in the cut-outs 180 of the outer shell 132. The isolator 136 is made of a dielectric material, such as, for example, a plastic material. In alternative embodiments, the isolator 136 can be made of different dielectric materials which electrically isolate the hub 128 from the outer shell 132.

The isolator 136 includes a substantially cylindrically shaped hollow inner ring 208, which is generally concentrically arranged around the axis of rotation 140 and includes an inner ring inwardly facing surface 212 and an inner ring outwardly facing surface 216. The inner ring inwardly facing surface 212 is configured to be in direct contact with the outwardly facing main body surface 156 of the hub 128, and the inner ring outwardly facing surface 216 is configured to be in direct contact with the innermost circumferential surface 184 of the outer shell 132.

The isolator also includes a substantially cylindrically shaped hollow outer ring 220, which is generally concentrically arranged around the axis of rotation 140 and the inner ring 208. The outer ring 220 includes an outer ring inwardly facing surface 224 and an outer ring outwardly facing surface 228. The outer ring inwardly facing surface 224 is configured to be in direct contact with the outermost circumferential surface 164 of the spokes 148, and the outer ring outwardly facing surface 228 is configured to be in direct contact with the outermost circumferential surface 192 of the outer shell 132.

The isolator 136 further includes inwardly facing angled surfaces 232 connecting the inner ring inwardly facing surfaces 212 to the outer ring inwardly facing surfaces 224. The inwardly facing angled surfaces 232 are configured to be in direct contact with the angled outwardly facing surfaces 160 of the spokes 148. The isolator 136 further includes outwardly facing angled surfaces 236 connecting the inner ring outwardly facing surfaces 216 with the outer ring outwardly facing surfaces 228. The outwardly facing angled surfaces 236 are configured to be in direct contact with the angled inwardly facing surfaces 188 of the cut-outs 180.

In the embodiment shown in FIGS. 2A, 2B, 3A, and 3B, the isolator 136 is molded between the hub 128 and the outer shell 132. Accordingly, in the embodiment shown in FIGS. 2A, 2B, 3A, and 3B, the material of which the isolator 136 is made is also moldable. The isolator 136 is molded between the hub 128 and the outer shell 132 such that the isolator 136 has a uniform thickness T between the hub 128 and the outer shell 132. The isolator 136 is also molded between the hub 128 and the outer shell 132 such that the isolator 136 is formed within the notches 168 formed in the spokes 148. This integration of the isolator 136 into the hub 128 prevents movement of the isolator 136 relative to the hub 126 in a direction along the axis of rotation 140. The isolator 136 is also molded between the hub 128 and the outer shell 132 such that the isolator 136 is formed within the notches 196 formed in the outer shell 132. This integration of the isolator 136 into the outer shell 132 prevents movement of the isolator 136 relative to the outer shell 132 in a direction along the axis of rotation 140.

An alternative embodiment, shown in FIG. 4, the hub 128, the outer shell 132, and the isolator 136 can be formed as three separate parts and can subsequently fitted together. In such embodiments, the isolator 136 is not molded between the hub 128 and the outer shell 132. Accordingly, as shown in FIG. 5A, the hub 128 need not include the notches 168, and as shown in FIG. 5C, the outer shell 132 need not includes the notches 196. However, as shown in FIGS. 5A, 5B, and 5C, respectively, the hub 128, the isolator 136, and the outer shell 132 can be otherwise shaped and configured as described above with respect to the embodiments of FIGS. 2A, 2B, 3A, and 3B.

Figure 4:
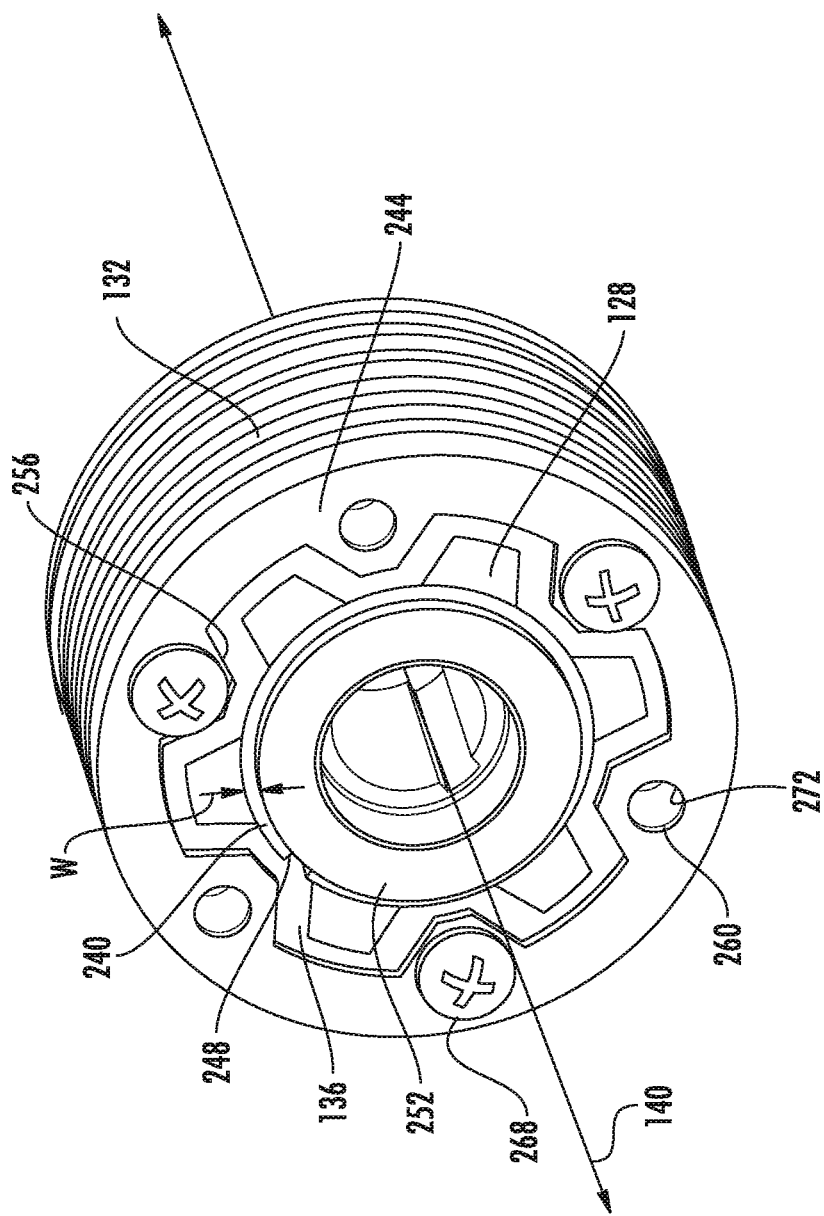
FIG. 4 depicts a front perspective view of another output member including a hub, an isolator, and an outer shell configured for use in the power tool shown in FIG. 1.
Figure 5C:
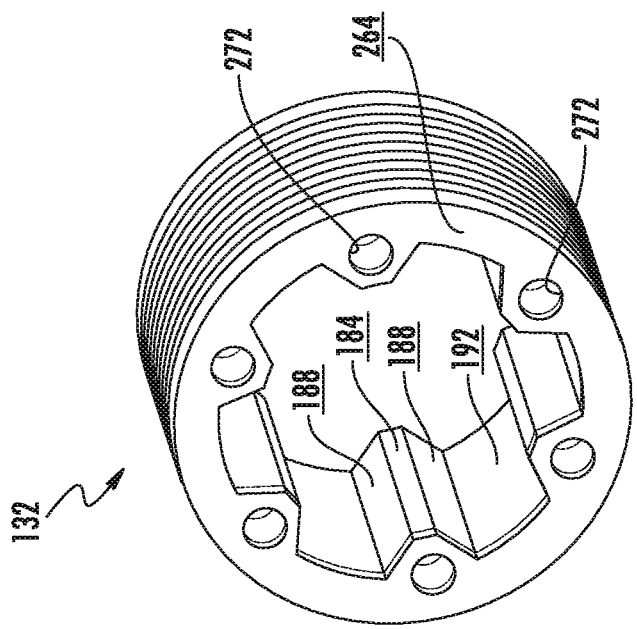
FIG. 5C depicts a front perspective view of one embodiment of an outer shell configured for use in the output member shown in FIG. 4.
Figure 5B:
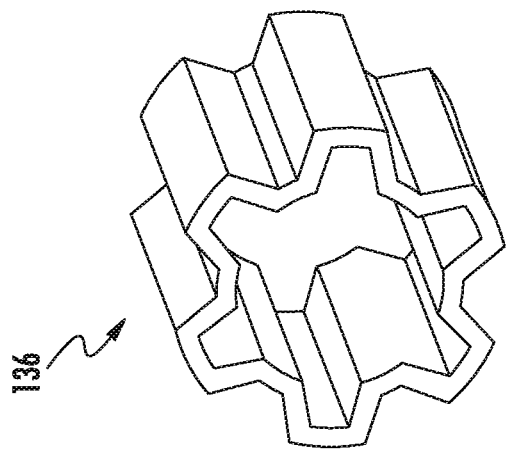
FIG. 5B depicts a front perspective view of one embodiment of an isolator configured for use in the output member shown in FIG. 4.
Figure 5A:
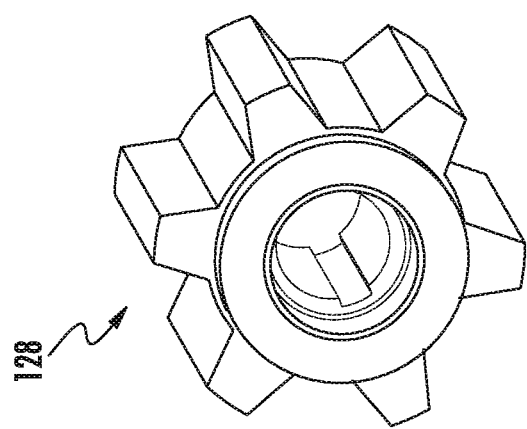
FIG. 5A depicts a front perspective view of one embodiment of a hub configured for use in the output member shown in FIG. 4.

In the embodiment shown in FIG. 4, the output member 112 can include a retaining ring 240, in lieu of the notches 168, to prevent relative movement of the isolator 136 and the hub 128 in a direction along the axis of rotation 140. Additionally, the output member 112 can include an end plate 244, in lieu of the notches 196, to prevent relative movement of the isolator 136 and the outer shell 132 in a direction along the axis of rotation 140.

The retaining ring 240 is a flexible ring made of, for example, metal, including a gap 248. By flexing the retaining ring 240 to widen the gap 248, the retaining ring 240 can be coupled to a boss 252 on the main body 144 of the hub 128 after the hub 128 has been received within the isolator 136. The retaining ring 240 is arranged substantially concentrically around the axis of rotation 140. The retaining ring 240 has a width W, which is sufficient to contact the isolator 126 above the inner ring inwardly facing surface 212 (shown in FIG. 2A). Accordingly, the retaining ring 240 prevents movement of the isolator 136 relative to the hub 128 in the direction along the axis of rotation 140.

The end plate 244 is a substantially disk shaped plate made of, for example, metal, including an access opening 256 and a plurality of fastener openings 260. The end plate 244 is shaped to be coupled to the outer shell 132 such that the access opening 256 is arranged substantially concentrically around the axis of rotation 140. In other words, the end plate 244 is coupled to the outer shell 132 on a front surface 264 (shown in FIG. 5C) of the outer shell 132 which is perpendicular to the innermost circumferential surface 184, the angled inwardly facing surfaces 188, and the outermost circumferential surface 192 of the outer shell 132.

The access opening 256 is shaped such that the end plate 244 does not cover the hub 128 or the inner ring inwardly facing 212, the outer ring inwardly facing surface 224, or the inwardly facing angled surfaces 232 (shown in FIG. 2A) of the isolator 136. The end plate 244 does, however, cover the inner ring outwardly facing surface 216, the outer ring outwardly facing surface 228, and the outwardly facing angled surfaces 236 (shown in FIG. 2A) of the isolator 136 and the front surface 264 of the outer shell 132. Thus, the end plate 244 prevents movement of the isolator 136 relative to the outer shell 132 in the direction along the axis of rotation 140. The end plate 244 is coupled to the outer shell 132 with fasteners 268 received in the fastener openings 260 and in corresponding fastener openings 272 formed in the front surface 264 of the outer shell 132 (shown in FIG. 5C). The fasteners 268 can be, for example, screws that are threadably coupled to mating threads provided in the fastener openings 260, 272.

In the embodiment of the hub 128 shown in FIG. 2B, the central opening 152 includes ribs or teeth configured to matingly couple the hub 128 to corresponding complementary ribs or teeth of the power tool 100. Alternatively, in the embodiment shown in FIG. 3A, the central opening 152 of the hub 128 can be threaded to threadably couple the hub 128 to corresponding complementary threads of the power tool 100. As another alternative, as shown in the embodiment in FIG. 5A, the central opening 152 of the hub 128 can include a spline or a keyway configured to matingly couple the hub 128 to corresponding complementary splines or keys of the power tool 100. In any of these or other alternative embodiments, the central opening 152 of the hub 128 is configured to matingly receive a portion of the power tool 100 to couple the output member 112 to the power tool 100 such that the output member 112 can transfer rotation and torque generated by the motor 104 of the power tool 100 to the working element, such as the saw blade 108, of the power tool 100.

The complementary shapes of the hub 128, the isolator 136, and the outer shell 132 of the output member 112 enable the output member 112 to transfer rotation and torque from the motor 104 to the saw blade 108 with robust mechanical strength. Additionally, the electrically isolating material properties of the isolator 136 isolate electrical energy in the hub 128 from electrical energy in the outer shell 132.

The embodiments of the output member 112 described above and shown in FIGS. 2A-5C are configured for use in a pulley system, such as that shown in the power tool 100 of FIG. 1. As described below, however, the output member 112 can also be adapted for use in alternative embodiments.

Figure 6:
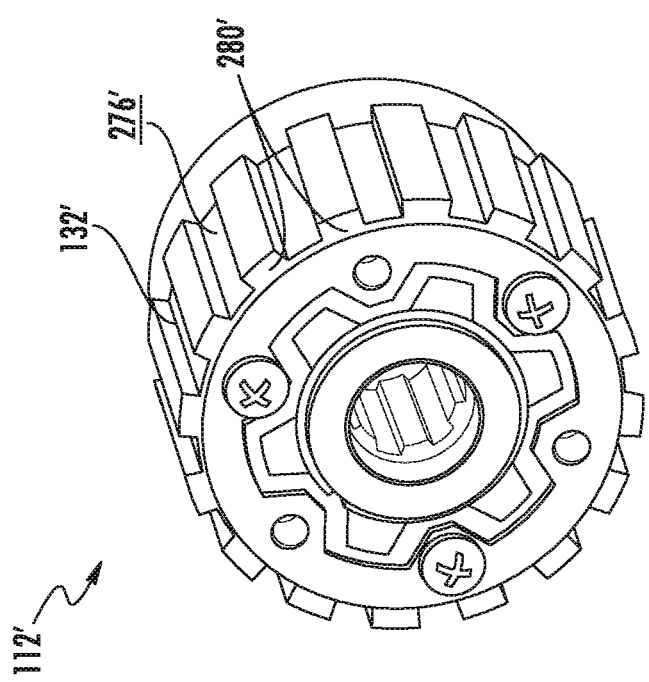
FIG. 6 depicts a front perspective view of another embodiment of an output member configured for use in a power tool.

As shown in FIG. 6, an alternative embodiment of an output member 112' is configured for use in a power tool wherein the outer shell 132' is coupled to the working element, such as saw blade 108, via meshing ribs or teeth rather than a pulley system. The output member 112' includes an outer shell 132' having an outer surface 276', which includes a plurality of ribs or teeth 280' that are configured to mate with corresponding complementary ribs or teeth to couple the outer shell 132' to the working element.

Figure 7:
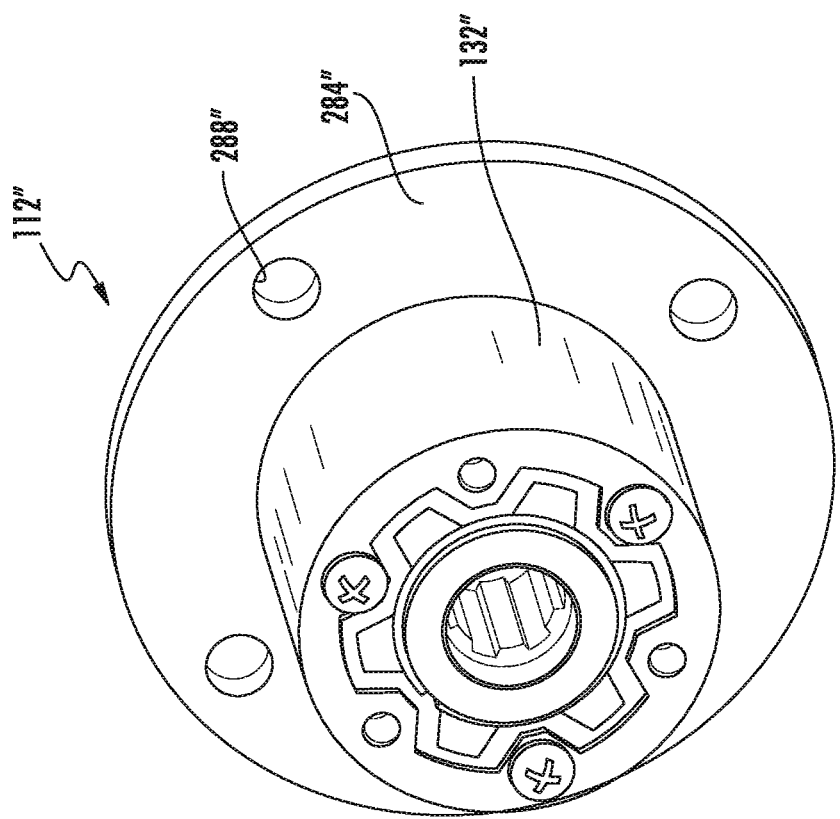
FIG. 7 depicts a front perspective view of another embodiment of an output member configured for use in a power tool.

As shown in FIG. 7, another alternative embodiment of an output member 112" is configured for use in a power tool wherein the outer shell 132" is coupled to the working element, such as a saw blade 108, via a flange rather than a pulley system. The output member 112" includes an outer shell 132" having a flange 284" integrally formed with the outer shell 132". The flange 284" includes a plurality of fastener openings 288" configured to couple the outer shell 132" to the working element.

Figure 8:
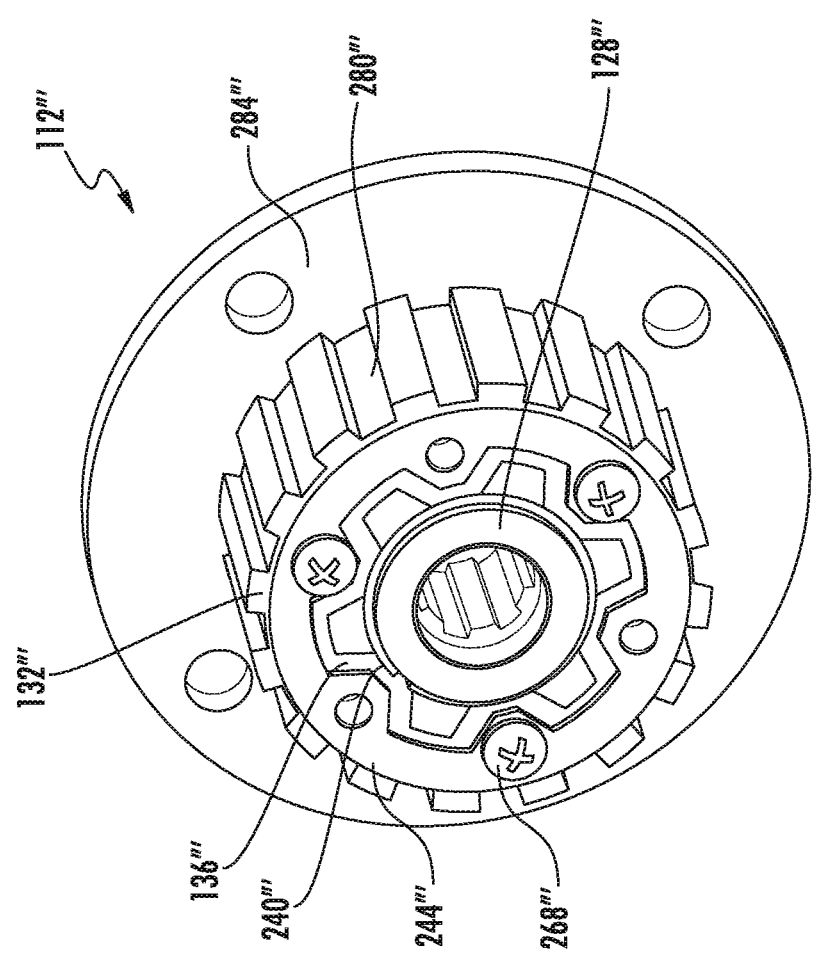
FIG. 8 depicts a front perspective view of another embodiment of an output member configured for use in a power tool.

As shown in FIG. 8, in another alternative embodiment, the embodiments of FIGS. 6 and 7 can also be combined in the output member 112'''. Thus, the output member 112''' includes a hub 128''' and an isolator 136''' coupled to the hub 128''' and retained axially thereon by a retaining ring 240'''. The output member 112''' also includes an outer shell 132''' coupled to the isolator 136''' and retained axially thereon by the end plate 244''' and the fasteners 268'''. The outer shell 132''' of the output member 112''' also includes ribs or teeth 280''' formed on the outer surface 276''' of the outer shell 132''' and a flange 284''' integrally formed with the outer shell 132'''.

Figures 9A, 9B, 9C:
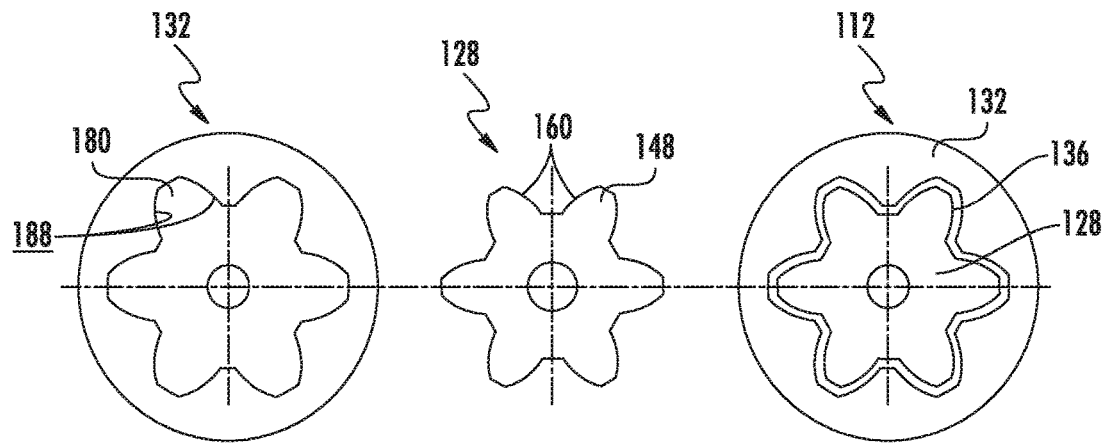
FIG. 9A depicts a schematic view of an alternative shape of an outer member.
FIG. 9B depicts a schematic view of an alternative shape of a hub that is complementary to the alternative shape of the outer member of FIG. 9A.
FIG. 9C depicts a schematic view of an alternative shape of an isolator interposed between the outer member of FIG. 9A and the hub of FIG. 9B.

It is noted that the spokes 148, cut-outs 180, and isolator 146 can have corresponding shapes which are different than those shown in the embodiments of FIGS. 2A-8 without changing the operation of the output member 112. For example, as shown in FIGS. 9A, 9B, and 9C, the hub 128, outer shell 132, and isolator 136 can have a more rounded shape such that the angled outwardly facing surfaces 160 of the spokes 148 (shown in FIG. 9B) are not substantially planar. Similarly, the corresponding angled inwardly facing surfaces 188 of the cut-outs 180 of the outer shell 132 (shown in FIG. 9A) are not substantially planar. Accordingly, the surfaces of the isolator 136 (shown in FIG. 9C) are configured to conform to the rounded surfaces of the spokes 148 and cut-outs 180 of the hub 128 and outer shell 132 as the isolator 136 is interposed between the hub 128 and the outer shell 132.

Figures 10A, 10B:
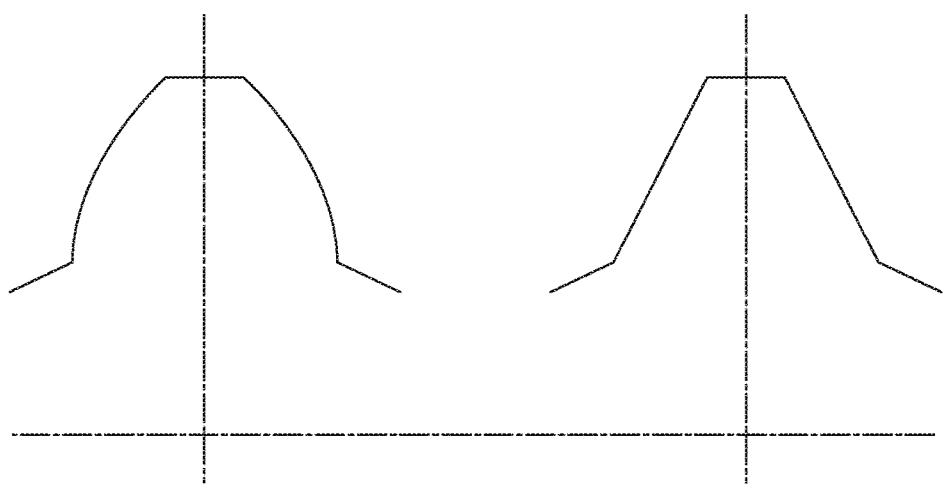
FIG. 10A depicts the exemplary shape of the spokes and complementarily shaped cut-outs shown in FIGS. 9A-9C.
FIG. 10B depicts another alternative shape of the spokes and complementarily shaped cut-outs shown in FIGS. 9A-9C.

FIGS. 10A and 10B show an outline which can form the shape of the spokes 148 and complementarily shaped cutouts 180. As shown in FIG. 10A, the shape can include curves rather than being entirely planar and linear. Alternatively, as shown in FIG. 10B, the shape can include only linear segments.

FIGS. 11A and 11B depict yet another embodiment of corresponding shapes of the outer shell 132 (shown in FIG. 11A) and the hub 128 (shown in FIG. 11B). In this embodiment, the angled inwardly facing surfaces 188 of the cutouts 180 meet the outermost circumferential surface 192 at nearly perpendicular angles. Similarly, the angled outwardly facing surfaces 160 of the spokes 148 meet the outermost circumferential surfaces 164 of the spokes 148 at nearly perpendicular angles.

Regardless of the shapes of the spokes 148 and cut-outs 180, the shapes are formed to correspond to one another such that the isolator 136 interposed between the hub 128 and the outer shell 132 is in contact with the outwardly facing surfaces of the hub 128 and the inwardly facing surfaces of the outer shell 132 and the isolator 136 has a uniform thickness T between the hub 128 and the outer shell 132. This configuration provides uniform surfaces for the transfer of force between the hub 128, the isolator 136, and the outer shell 132 to provide the output member 112 with the most robust mechanical strength in transferring rotation and torque from the motor 104 to the saw blade 108 of the power tool 100.

The foregoing detailed description of one or more embodiments of the output member for a power tool has been presented herein by way of example only and not limitation. It will be recognized that there are advantages to certain individual features and functions described herein that may be obtained without incorporating other features and functions described herein. Moreover, it will be recognized that various alternatives, modifications, variations or improvements of the above-disclosed embodiments and other features and functions, or alternatives thereof, may be desirably combined into many other different embodiments, systems, or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A power tool for performing a process on a workpiece, the power tool comprising:
    a motor configured to generate rotation and torque;
    a working element configured to contact the workpiece; and
    an output member configured to transfer the rotation and torque from the motor to the working element, the output member including:
        an axis of rotation about which the output member is configured to be driven rotationally by the motor;
        a hub configured to be coupled to the motor, the hub including:
            a main body; and
            a plurality of spokes integrally formed with the main body, each spoke including a first angled outwardly facing surface, a second angled outwardly facing surface, and an outermost circumferential surface, each outermost circumferential surface extending from the first angled outwardly facing surface to the second angled outwardly facing surface of a respective spoke, at least one spoke including at least one notch formed in the outermost circumferential surface, the at least one notch extending partially into each of the respective first and second angled outwardly facing surfaces;
        an outer shell configured to be coupled to the working element; and
        an isolator interposed between the hub and the outer shell and configured to electrically isolate the hub from the outer shell, the isolator extending into the at least one notch.

2. The power tool of claim 1, wherein the isolator is made of a dielectric material and is in direct contact with the hub and the outer shell.

3. The power tool of claim 2, wherein the isolator is made of a plastic material.

4. The power tool of claim 1, wherein the isolator has a uniform thickness between the hub and the outer shell.

5. The power tool of claim 1, wherein:
    the isolator is in direct contact with the main body and each spoke of the plurality of spokes.

6. The power tool of claim 1, wherein:
    the isolator includes a plurality of outwardly facing surfaces opposite the spokes and the main body of the hub, and
    the outer shell is in direct contact with each of the outwardly facing surfaces of the isolator.

7. The power tool of claim 6, wherein:
    the outer shell includes a plurality of inwardly facing surfaces in contact with the outwardly facing surfaces of the isolator, and
    the output member includes a plurality of grooves formed on the inwardly facing surfaces to engage the isolator to prevent relative movement of the isolator and the outer shell along the axis of rotation.

8. The power tool of claim 1, wherein the isolator is molded between the hub and the outer shell.

* * * * *